United States Patent [19]
Rose et al.

[11] Patent Number: 5,943,615
[45] Date of Patent: Aug. 24, 1999

[54] METHOD AND APPARATUS FOR PROVIDING AUTHENTICATION SECURITY IN A WIRELESS COMMUNICATION SYSTEM

[75] Inventors: Gregory G. Rose, Mortlake, Australia; Roy F. Quick, San Diego, Calif.

[73] Assignee: Qualcomm, Incorpoarated, San Diego, Calif.

[21] Appl. No.: 08/784,279

[22] Filed: Jan. 15, 1997

[51] Int. Cl.⁶ .................................................. H04Q 7/20
[52] U.S. Cl. .................... 455/411; 485/410; 340/825.31; 340/825.34; 380/23; 380/43
[58] Field of Search .................................... 455/410, 411, 455/33, 53, 560, 561, 575; 380/43, 46, 49, 23; 379/62, 63; 340/825.31, 825.34, 825.44

[56] References Cited

U.S. PATENT DOCUMENTS

| | | | |
|---|---|---|---|
| 5,153,919 | 10/1992 | Reeds, III et al. | 380/44 |
| 5,239,294 | 8/1993 | Flanders et al. | 340/825.34 |
| 5,455,863 | 10/1995 | Brown et al. | 380/23 |
| 5,457,737 | 10/1995 | Wen | 379/62 |
| 5,572,193 | 11/1996 | Flanders et al. | 340/825.34 |
| 5,615,267 | 3/1997 | Lin et al. | 380/23 |
| 5,655,019 | 8/1997 | McKernan et al. | 380/6 |
| 5,689,563 | 11/1997 | Brown et al. | 380/23 |

FOREIGN PATENT DOCUMENTS

| | | |
|---|---|---|
| 0447380 | 9/1991 | European Pat. Off. . |
| 9202103 | 2/1992 | WIPO . |

OTHER PUBLICATIONS

Mohan, Seshadri "Privacy and Authentication Protocols for PCS" *IEEE Personal Communications* pp. 34–38 (Oct. 1996).

*Primary Examiner*—Wellington Chin
*Assistant Examiner*—Pablo N. Tran
*Attorney, Agent, or Firm*—Russell B. Miller; Bruce W. Greenhaus; Kent D. Baker

[57] ABSTRACT

An apparatus for providing authentication of a mobile station in a wireless communication system. The present invention takes the number dialed by the mobile station user and computes the 24 bit number (AUTH_DATA) for authentication in accordance with a hashing function that has the following characteristics. The hashing function takes as its input at least the entire dialed digit string contained in the request for service and the number of digits. In a preferred embodiment, the ordering of the digits affects the result, as well as, the values of the digits. The preferred embodiment of the hashing function also accepts some or all of the mobile station identifier data. The function provides as output a number of suitable size for input to a second calculation of an authentication signature, such as the 24 bits required for AUTH_DATA. The output number is created in such a way that there is a minimum likelihood that other sets of dialed digits may create the same result.

16 Claims, 3 Drawing Sheets

```
/* THIS VERSION TAKES ITS INPUT AS AN IS124 DIALLED DIGIT STRING */
#DEFINE DIALED(s,n) ((n) & 1 ? (s) [(n)/2] & 0xF : (s) [(n)/2] >> 4)

#DEFINE ROUNDS  8

/*
*RETURN A HASH OF THE DIALED DIGIT STRING INVOLVING ALL
*CHARACTERS AND THE LENGTH
*/
UNSIGNED LONG
DIGHASH(UNSIGNED CHAR *s INT n)
{
  INT              i, ROUND;
  UNSIGNED LONG    RESULT;
  STATIC UNSIGNED CHAR TRTAB[16] = { 15,5,6,10,0,3,8,9,13,11,2,14,1,4,7,12 };
  INT              v;
  UNSIGNED CHAR    BUF[6]; /* WHERE THE RESULT IS BUILT UP */
  INT              bi;

FOR (i=0; i<6; ++i)
      BUF[i] = (n + i) & 0xF;

v = bi = 0;
  FOR (ROUND = 0; ROUND < ROUNDS; ++ROUND) {
      /* WORK IN DIGITS */
      FOR (i = 0; i < n; ++i) {
            v += DIALED(s, i) + BUF[bi];
            v = TRTAB[v & 0xF];
            BUF[bi++] ^= v;
            IF (bi == 6) bi = 0;
      }

/* AVOID UNDUE SYNCHRONISATION */
      IF (n == 6 || n == 12)
            IF ( ++bi == 6) bi = 0;
  }

/* PREPARE RESULT FROM HASH AND LENGTH */
  RESULT = 0;
  FOR (bi = 0; bi < 6; ++bi)
      RESULT = (RESULT << 4) | BUF[bi];

RETURN (RESULT & 0xFFFFC0) | (n & 0x3F);
}
```

FIG. 3

METHOD AND APPARATUS FOR PROVIDING AUTHENTICATION SECURITY IN A WIRELESS COMMUNICATION SYSTEM

BACKGROUND OF THE INVENTION

I. Field of the Invention

The present invention relates to communication systems. More particularly, the present invention relates to a novel and improved method for mobile station authentication is a wireless communication system.

II. Description of the Related Art

Several cellular telephone systems standardized by the Telecommunications Industry Association (TIA) use the authentication scheme first standardized in EIA/TIA/IS-54-B. A similar scheme is described in Flanders, et al. in U.S. Pat. No. 5,239,294, entitled "METHOD AND APPARATUS FOR AUTHENTICATION AND PROTECTION OF SUBSCRIBERS IN A TELECOMMUNICATION SYSTEM", which is incorporated by reference herein. As one aspect of the authentication scheme used in IS-54-B, an authentication signature is computed by the mobile station and sent to the base station to prove that the mobile station is legitimately entitled to services via the cellular system. For mobile-originated requests for service, this authentication signature is a one-way hash, or enciphering, of some or all of the following information:

- The electronic serial number of the mobile station;
- The mobile subscription number, which may be the directory number or other identifier of the mobile subscriber;
- A random "challenge" value sent by the base station;
- A secret key; and
- The last six digits of the number dialed by the mobile station user.

The last six digits dialed by the mobile station user are placed in a 24-bit register referred to in the standards as AUTH_DATA. The authentication signature is calculated using AUTH_DATA, and is transmitted to the base station. The base station checks the signature provided by the phone against its own calculation of the signature and typically denies service if the signature provided does not match the calculated value. In principle, only the legitimate mobile station can create the correct signature, because the secret key is not known to fraudulent mobile stations.

The intent of including the dialed digits is to prevent "replay attacks" in which a fraudulent user simply repeats the same signature and identification information used previously by a legitimate user. In principle, the fraudulent mobile station could not obtain service in this manner unless the same directory number was being called.

There exists a flaw in the use of dialed digits as described in the IS-54-B standard and that is that in many implementations of wireless switch equipment, the attacker can simply append to the dialed number six extra digits that are the same as the last six dialed digits from an origination sent by a legitimate use and send the identification and signature as used by the legitimate user. The extra digits will be ignored by the switch (for example, in the case of the advertised number "1-800-FLY-CHEAP", the last digit corresponding to "P" is not processed). The authentication signature, however, will be computed by the base station using these extra digits, and therefore the signature will match the expected value, allowing the fraudulent user to obtain service.

One method to combat this is to avoid using only the last digits of the dialed number. For example, one may use digits selected throughout the dialed number, rather than from only the final digits. While this is an improvement, it is less secure than the method proposed in this invention, which includes the entire dialed number and the digit count as part of the calculation of the signature.

SUMMARY OF THE INVENTION

The present invention is a novel and improved method and apparatus for providing authentication of a mobile station in a wireless communication system. The present invention takes the number dialed by the mobile station user and computes the 24 bit number (AUTH_DATA) for use in authentication in accordance with a hashing function that has the following characteristics:

The hashing function takes as its input at least the entire dialed digit string contained in the request for service and the number of digits. In a preferred embodiment, the ordering of the digits affects the result, as well as, the values of the digits. The preferred embodiment of the hashing function also accepts some or all of the mobile station identifier data.

The hashing function provides as output a number of suitable size for input to a second calculation of an authentication signature, such as the 24 bits required for AUTH_DATA.

The hashing function takes as its input at least the entire dialed digit string contained in the request for service and the number of digits. In a preferred embodiment, the ordering of the digit, as well as, the values of the digits affect the result. The preferred embodiment of the hashing function also accepts some or all of the mobile station identifier data.

The output number is created in such a way that there is a minimum likelihood that other sets of dialed digits may create the same result.

In a preferred embodiment, the number of digits in the dialed string is inserted directly into the 24-bit number, to prevent changing the number of digits that can be transmitted.

In the preferred embodiment of the invention, the algorithm accepts a string of dialed digits of known length, and produces as output a 24-bit hash code intended to be used in the generation of the authentication signature. Hashing algorithms which encrypt data to provide a combination of the data as a means of validating the legitimacy of a user are well known in the art. In this description, it is assumed that one or more digits are entered by the user. If no digits are entered, AUTH_DATA can be wholly formed using the mobile station identifiers. The identifiers can, for example, be used to modify the initial value of the buffer.

In the exemplary embodiment, the hashing function performs 8 rounds of operations on a 24 bit buffer. All operations on dialed digits and the buffer are performed modulo-16, that is, with 4 bits of significance. The rounds of operations are tied together by a lookup table "trtab". This is a 16-entry table which is a permutation of the integers 0 through 15, with the additional property that for each index, the table entry at that index is not equal to the index.

The 24 bit buffer is treated as 6 modulo-16 integers. The buffer is initialized with consecutive integers, with the first being the length of the dialed digit string, modulo 16. A variable "v" (initially 0) is modified as the algorithm proceeds by updating its value, adding the current buffer contents and the current dialed digit, and is then passed through the lookup table to provide a non-linear transformation. The resulting value is then combined, using an exclusive-or operation, with the current buffer position.

The buffer is processed in a circular fashion, by starting with the first entry, processing one entry at a time, and after the last entry, starting with the first again. The algorithm proceeds by performing 8 passes over the complete dialed digit string, combining the dialed digit and current buffer contents in the manner described above.

In the case that there are either 6 or 12 digits in the dialed number, the passes over the buffer and the dialed number would be in synchronization, and this is considered undesirable, so at the end of each pass over the dialed digits the buffer index is moved along 1 position. This would also be true for 18 digits (and any larger multiple of 6) but in this case so much information is being processed that the synchronization is not thought to be important.

When this processing is complete, a 24 bit integer is formed from the buffer, taking index 0 as the most significant 4 bits. The least significant 6 bits of this integer are replaced with the length of the digit string (modulo 64). In this way only dialed numbers of equal lengths (modulo 64) can possibly produce the same output.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 3 is a "C" program implementing the exemplary embodiment of the method of enciphering the dialed number of the present invention.

DETAILED DESCRIPTION OF THE PREFERRED EMBODIMENTS

Figure 1:
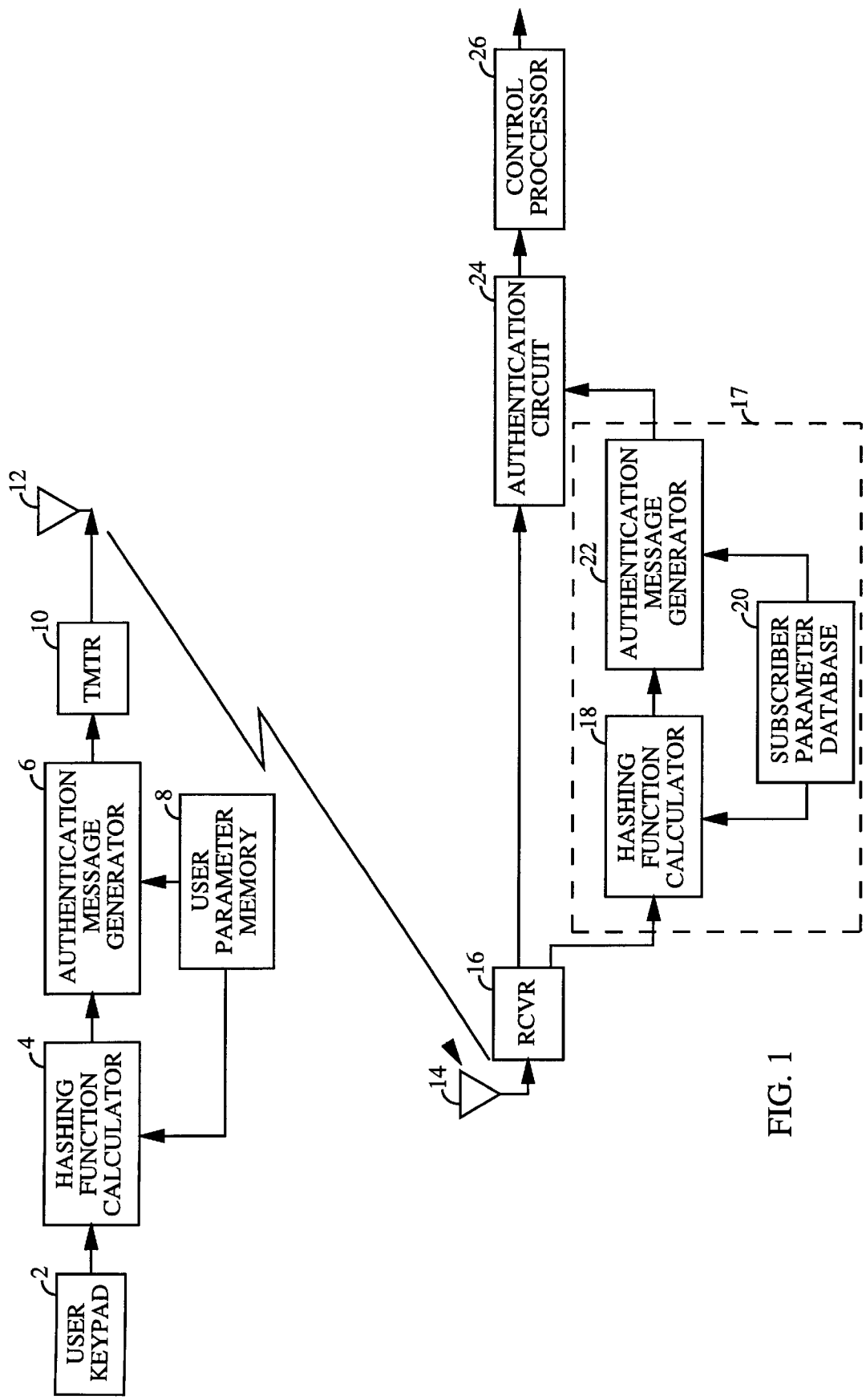
FIG. 1 is a block diagram illustrating the authentication system of the present invention.

The authentication system of the present invention is illustrated in FIG. 1. When a mobile station user desires to initiate a call, he enters the number which he is calling into user keypad 2. That number is provided to hashing function calculator 4, which generates a 24 bit authentication data sequence (AUTH_DATA).

In the present invention, hashing function calculator 4 performs an operation on the number entered by the mobile station user that satisfies the following conditions. Hashing function calculator 4 utilizes the entire digit string contained in the service request and also utilizes the number of digits in the string to generate the 24 bit authentication data sequence (AUTH_DATA). In a preferred embodiment, hashing function calculator 4 utilizes a function which generates the authentication data sequence in accordance with both the values of the digits entered by the mobile station user and the order of the digits entered by the mobile station user.

In addition, hashing function calculator 4 uses some or all of the mobile station identifier data which is provided to hashing function calculator 4 by user parameter memory 8. User parameter memory 8 would typically be implemented using a read only memory (ROM) device or programmable read only memory (PROM) device as is well known in the art. In addition, the authentication data sequence generated by hashing function calculator 4 should be created in such a way that there is minimum likelihood that other sets of number entered would yield the same authentication data sequence.

The authentication data sequence is provided by hashing function calculator 4 to authentication message generator 6. Authentication message generator 6 generates a signature which is used to authenticate the identity of the mobile station. Authentication message generator 6 generates the signature in accordance with the authentication data sequence (AUTH_DATA) provided by hashing function calculator 4 and the user parameter data provided by user parameter memory 8. In the exemplary embodiment, authentication message generator 6 operates in accordance with a predetermined signature generation algorithm which generates an authentication signature to validate the identity of user. In the present invention, authentication message generator 6 uses the 24 bits (AUTH_DATA) generated by the hashing function calculator 4.

The authentication signature is provided to transmitter (TMTR) 10 which encodes, modulates, upconverts and amplifies the signature message and transmits the message signal through antenna 12. At the base station, the transmitted signal is received by antenna 14 and provided to receiver (RCVR) 16, which amplifies, downconverts, demodulates and decodes the signal and provides the message to authentication circuit 24. In addition, the authentication message is provided to generation circuit 17, which generates a local version of the authentication signature using information from the transmitted message and information regarding the mobile station stored in parameter database 20.

In generating the local version of the authentication signature, the dialed number is extracted from the message and provided to hashing function calculator 18 which operates identically to hashing function calculator 4. Hashing function calculator 18 generates the 24 bit authentication data sequence (AUTH_DATA) and provides it to authentication message generator 22. Authentication message generator 22 generates a local version of the authentication signature as described in accordance with the authentication data sequence (AUTH_DATA) and mobile station parameters provided by subscriber parameter database 20. The locally generated signature is then provided to authentication circuit 24 which compares the locally generated signature with the received signature. The result of the comparison is provided to control processor 26, which determines the action to be taken based on the result of the comparison. If there is a match between the locally generated signature and the received signature, then service is typically provided to mobile station user. However, if the locally generated signature and the received signature do not match then service is typically denied.

Figure 2:
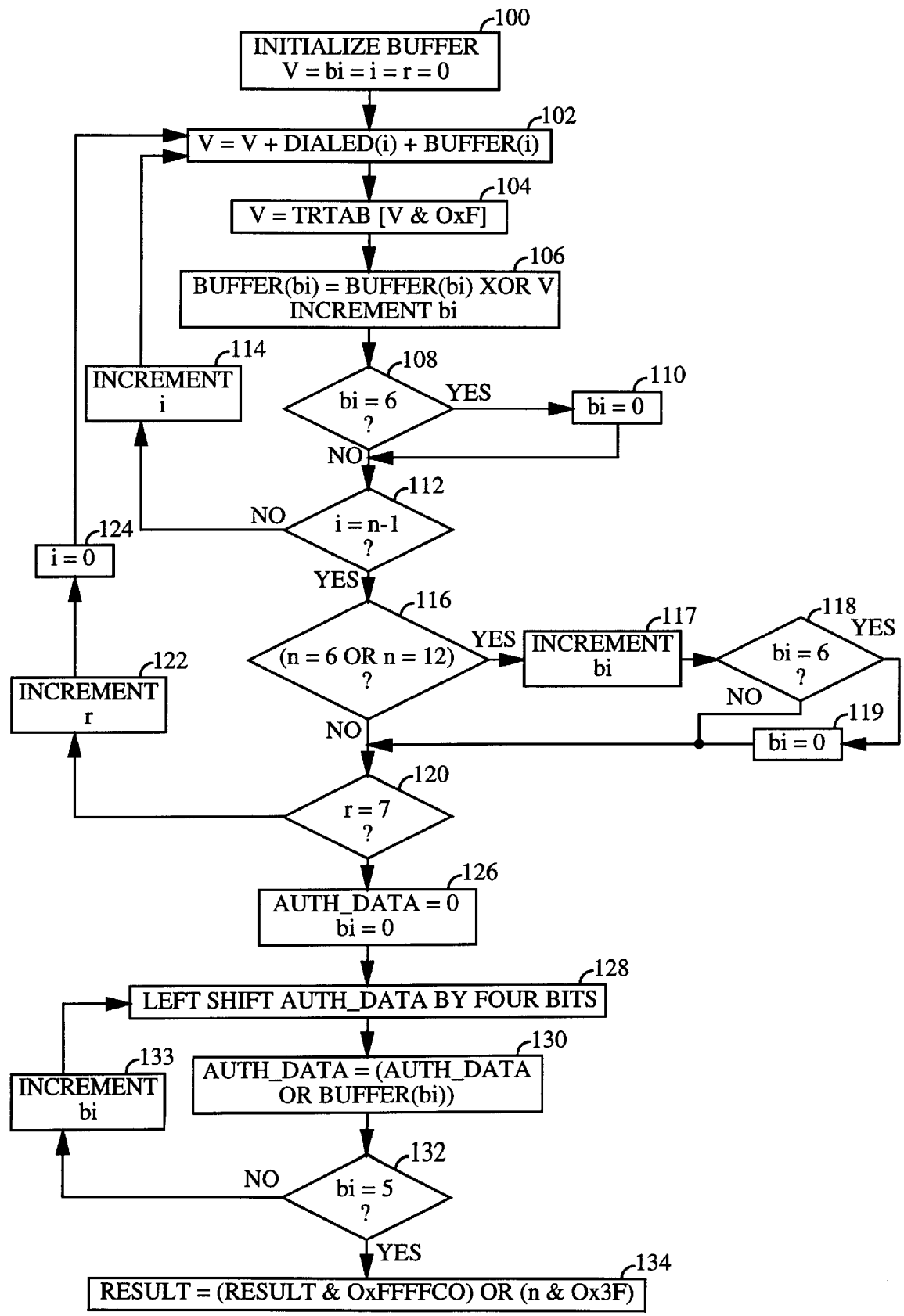
FIG. 2 is a flow diagram illustrating an exemplary embodiment of the method of enciphering the dialed number of the present invention.

FIG. 2 illustrates a flowchart of the method used by hashing function calculators 4 and 18 to generate the 24 bit authentication data sequence (AUTH_DATA). In block 100 a buffer is initialized. The buffer is treated as 6 modulo 16 integers. In the exemplary embodiment, the buffer is initialized with the consecutive integers the first of which is the length of the digit sequence entered by the mobile station user. In addition, variables v, bi, i and r are initialized to 0. In block 102, the variable v is set equal to the sum of its current value, the ith digit entered by the mobile station user (dialed(i)) and the ith entry in the buffer (buffer(i)).

In block 104, v is set to the an element in the array trtab. In the exemplary embodiment, the array trtab is set in such a fashion that the index of an entry and the value of that entry are never equal. For example, the value of the ith entry is never i. The trtab array has 16 elements with values not being repeated between 0 and 15. In the exemplary embodiment the trtab array is set to:

$$trtab=\{15,5,6,10,0,3,8,9,13,11,2,14,1,4,7,12\} \quad (1)$$

The value of v, in block 104, is set by AND-ing the current value of v with the value 0×F and using that as the index to the array trtab. In block 106, the buffer value at index bi (buffer(bi)) is set to the result of exclusive-OR of the current value of the buffer value at index bi and the value v.

In control block 108, a test is made to determine whether bi is equal to 6. If bi is equal to 6, then, in block 110, bi is reset to a value of 0 and the flow proceeds to control block 112. If the current value of bi is not equal to 6, in block 108, then the flow proceeds directly to control block 112. In control block 112, a test is made to determine whether loop index i has reached a value of n−1, where n is equal to the number of digits entered by the mobile station user. If i has not reached a value of n−1, then, in block 114, i is incremented, the flow is directed to block 102 and the operation continues as described above.

When the loop index i reaches the value n−1, the flow proceeds to block 116. In block 116, if the number of digits entered (n) is equal to 6 or 12, then the flow proceeds to block 117. If, in block 116, the number of digits entered is not equal to 6 or 12, then the flow moves directly to block 120. In block 117, the variable bi is incremented, and flow proceeds to block 118. In block 118, if the value of bi is 6, flow proceeds to block 119, otherwise to block 120. In block 119, bi is set to 0, and flow proceeds to block 120. In block 120, the loop variable r is tested to determine whether it has attained a value of 7. If r has not reached a value of 7, then the value of r is incremented, in block 122, the loop variable i is reset to zero in block 124, the flow moves to block 102 and the operation proceeds as described earlier.

If the loop variable, r, has reached a value of 7, then the 24 bit authentication data sequence is generated from the values stored in the buffer and the length of the number of digits entered by the user of the mobile station. In block 126, the variable AUTH_DATA which will ultimately contain the 24 bit authentication data sequence is initialized. In addition, the loop variable bi is set to zero. The value of AUTH_DATA is bit shifted left four times in block 128. The value of AUTH_DATA is then bitwise OR-ed with the bi-th element in the buffer (buffer(bi)).

In block 132, loop variable bi is tested to determine whether it has reached a value of 5. If the loop variable bi has not reached a value of 5, then the loop variable is incremented in block 133, the flow proceeds to block 128 and the operation proceeds as described above. If the loop variable (bi) has reached a value of 5, the flow moves to block 134. In block 134, the value of AUTH_DATA is bitwise AND-ed with the value 0×FFFFC0 and the result of the AND operation is bitwise OR-ed with result of AND-ing the number of digits entered by the mobile station user (n) and the value 0×3F yielding the final 24 bit authentication data sequence AUTH_DATA.

A "C" program implementing the operation described above is provided in FIG. 3.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In mobile communication system, a method for authenticating the identity of a mobile station, comprising the steps of:

receiving a sequence of dialed digits entered by a mobile station user which identify a target communication unit;

generating a first number derived from said sequence of dialed digits and the number of digits in said sequence of dialed digits;

generating an authentication message in accordance with said first number; and transmitting said sequence of dialed digits and said authentication message from said mobile station to a remote base station.

2. The method of claim 1 further comprising the steps:

receiving at said base station said sequence of dialed digits and said authentication message;

generating a local version of said first number derived from said received sequence of dialed digits and the number of digits in said received sequence of dialed digits;

generating a locally generated authentication message in accordance with said locally generated first number; and comparing said locally generated authentication message with said received authentication message.

3. The method of claim 2 wherein the step of generating a locally generated authentication message is performed in accordance with a set of mobile station identification parameters stored in said base station.

4. The method of claim 1 wherein the step of generating an authentication message is performed in accordance with a set of mobile station identification parameters stored in said mobile station.

5. The method of claim 1 wherein the step of generating said first number comprises setting part of said first number to said number of digits in said sequence of dialed digits.

6. In mobile station, a method for authenticating the identity of said mobile station, comprising the steps of:

receiving a sequence of dialed digits entered by a mobile station user which identify a target communication unit;

generating a first number derived from said sequence of dialed digits and the number of digits in said sequence of dialed digits;

generating an authentication message in accordance with said first number; and transmitting said sequence of dialed digits and said authentication message from said mobile station to a remote base station.

7. The method of claim 6 wherein the step of generating an authentication message is performed in accordance with a set of mobile station identification parameters stored in said mobile station.

8. The method of claim 6 wherein the step of generating said first number comprises setting part of said first number to said number of digits in said sequence of dialed digits.

9. In base station, a method for authenticating the identity of a mobile station, comprising the steps of:

receiving at said base station a sequence of dialed digits and an authentication message transmitted by said mobile station;

generating a local version of said first number derived from said received sequence of dialed digits and the number of digits in said received sequence of dialed digits;

generating a locally generated authentication message in accordance with said locally generated first number; and comparing said locally generated authentication message with said received authentication message.

10. The method of claim 9 wherein the step of generating a locally generated authentication message is performed in accordance with a set of mobile station identification parameters stored in said base station.

11. The method of claim 9 wherein the step of generating said local version of said first number comprises setting part of said local version of said first number to said number of digits in said received sequence of dialed digits.

12. A mobile station comprising:

means for receiving a sequence of dialed digits entered by a mobile station user which identify a target communication unit;

means for generating a first number derived from said sequence of dialed digits and the number of digits in said sequence of dialed digits;

means for generating an authentication message in accordance with said first number; and means for transmitting said sequence of dialed digits and said authentication message from said mobile station to a remote base station.

13. The mobile station of claim 12 further comprising:

mobile station identification parameter means for providing identification parameters; and wherein said means for generating an authentication message is responsive to said identification parameters.

14. The mobile station of claim 12 wherein said means for generating a first number sets part of said first number to said number of digits in said sequence of dialed digits.

15. A base station comprising:

means for receiving at said base station a sequence of dialed digits and an authentication message transmitted by said mobile station;

means for generating a local version of said first number derived from said received sequence of dialed digits and the number of digits in said received sequence of dialed digits;

means for generating a locally generated authentication message in accordance with said locally generated first number; and means for comparing said locally generated authentication message with said received authentication message.

16. The method of claim 15 wherein means for generating said local version of said first number sets part of said first number to said number of digits in said received sequence of dialed digits.

* * * * *